United States Patent [19]

Lim

[11] Patent Number: 4,639,205
[45] Date of Patent: Jan. 27, 1987

[54] PUMP SHAFT STIRRER FOR GRID MELTER

[75] Inventor: Hyun S. Lim, Martinsville, Va.

[73] Assignee: E. I. Du Pont de Nemours and Company, Wilmington, Del.

[21] Appl. No.: 636,254

[22] Filed: Jul. 31, 1984

[51] Int. Cl.[4] .............................................. B29B 13/02
[52] U.S. Cl. ........................... 425/200; 264/176.1; 366/147; 366/149; 366/295; 425/378 S
[58] Field of Search ............... 425/72 S, 200, 378 S, 425/382 R, 382.2, 398, 376 R; 264/176 F; 366/144, 147, 149, 295, 315, 317, 343, 316; 239/687; 414/206, 301; 34/59; 126/343, 5 R; 432/209, 210

[56] References Cited

U.S. PATENT DOCUMENTS

| 2,011,055 | 8/1935 | Klugh ............................. 264/176 R |
| 2,187,330 | 1/1940 | Rudd ................................... 414/206 |
| 2,370,469 | 2/1945 | Johnson et al. ................ 425/378 R |
| 2,683,073 | 7/1954 | Pierce ................................... 264/85 |
| 2,791,802 | 5/1957 | Weber ............................. 425/378 S |
| 3,010,147 | 11/1961 | Davis et al. ..................... 264/176 F |
| 3,102,301 | 9/1963 | Dechene .......................... 264/40.2 |
| 3,325,863 | 6/1967 | Nicita et al. ................. 126/343.5 A |
| 3,603,563 | 9/1971 | Holland ........................... 366/317 |
| 3,727,556 | 4/1973 | Adams ............................. 366/147 |
| 3,748,074 | 7/1973 | Nitta et al. .................... 425/376 R |
| 3,751,533 | 8/1973 | Bowen, Jr. ....................... 264/40.1 |
| 4,117,073 | 9/1978 | Koch et al. .................... 264/176 R |
| 4,453,832 | 6/1984 | Schumacher et al. ............. 366/315 |
| 4,453,837 | 6/1984 | Sharps ............................. 366/147 |

FOREIGN PATENT DOCUMENTS

| 125227 | 6/1931 | Fed. Rep. of Germany ...... 366/147 |
| 842997 | 7/1952 | Fed. Rep. of Germany ... 425/382.2 |
| 202692 | 9/1958 | Fed. Rep. of Germany ... 425/378 S |
| 375262 | 6/1962 | Japan ............................. 264/176 F |
| 375261 | 6/1962 | Japan ................................. 425/207 |
| 752665 | 7/1956 | United Kingdom ............ 425/378 S |

Primary Examiner—Jay H. Woo
Assistant Examiner—J. Fortenberry

[57] ABSTRACT

A driven stirrer mounted above the melting grid in a melt grid spinning apparatus provides a means to distribute flake, descending from source of supply to the melt grid away from the center of the grid toward its sidewalls.

1 Claim, 3 Drawing Figures

PUMP SHAFT STIRRER FOR GRID MELTER

BACKGROUND OF THE INVENTION

This invention relates to melt spinning of particulate polymeric material and more particularly it relates to apparatus for providing distribution polymer flakes descending from the polymer flake supply to the melt grid beneath the polymer flake supply.

In the process for producing filamets and fibers from polymeric material as described by Pierce in U.S. Pat. No. 2,683,073, polymer is melted in a melting unit and then flows into a reservoir where it is mixed by a driven stirrer. A pump meters a supply of molten polymer from the reservoir to the spinning orifices. Dechene has described in U.S. Pat. No. 3,102,301 construction and use of a heated grid for melting the polymer. Heating fluid circulates through the grid. When using grids similar to those disclosed by Dechene to provide molten polymer for spinning, polymer flakes are charged into the grid to be melted. During the operation it is found that there is a greater tendency for the flake to flow toward the center of the grid. The existence of such a condition creates a problem of lower polymer temperatures at the center of the grid than the sidewalls of the grid at the same levels. This temperature gradient creates denier variations in the spun yarn.

SUMMARY OF THE INVENTION

The difficulties described above are obviated in accordance with this invention by providing a driven stirrer located between the top of the grid and the charging location of the flake supply. In the preferred embodiment the stirrer is in the shape of a cone with opposed pairs of blades extending from the periphery of the base of the cone. As a matter of convenience the cone is attached to the melt pump drive shaft which extends upwardly through the center of the melt grid to its drive motor.

DETAILED DESCRIPTION OF THE ILLUSTRATED EMBODIMENTS

Figure 1:
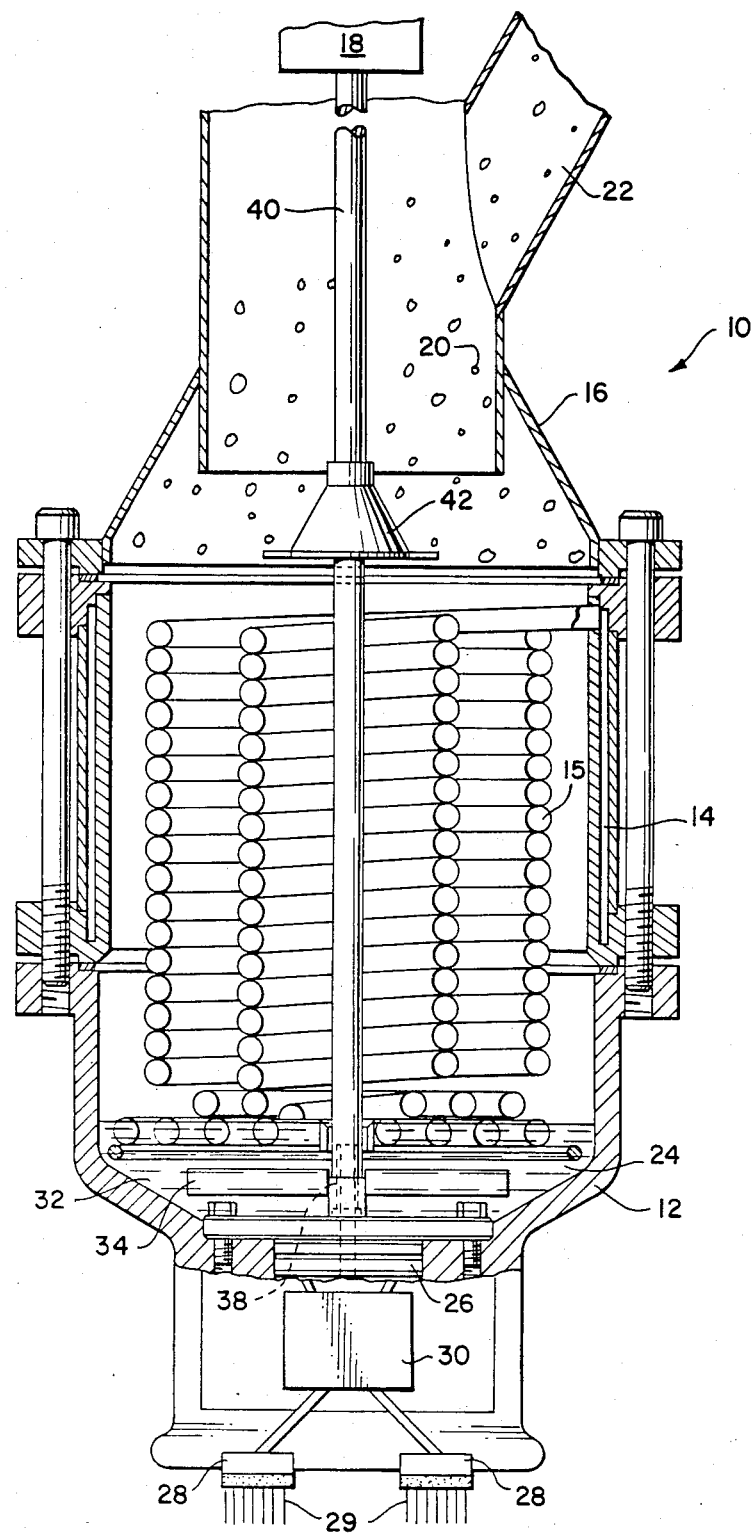
FIG. 1 is a vertical cross section of a melt spinning apparatus.
Figure 2:
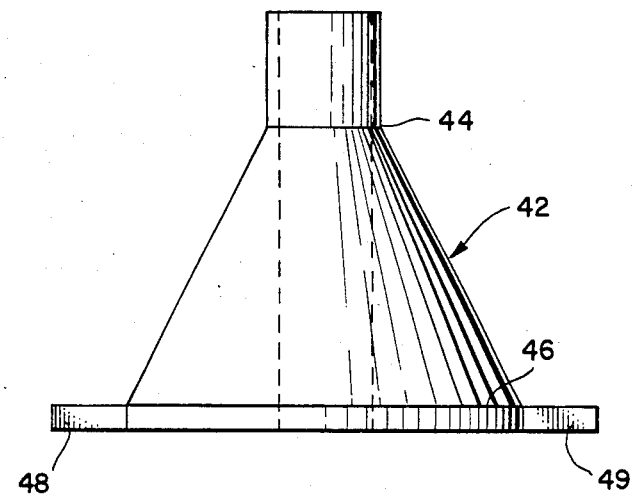
FIG. 2 is an enlarged elevation of the stirrer of this invention.

Referring to FIG. 1 the melt spinning apparatus chosen for purposes of illustration is generally designated 10 and includes a heated pump block 12 supporting melting grid 14 (including heated coils 15) which in turn supports motor stand 16 on which is mounted motor 18. A supply of solid flakes of polymer 20 are fed to melting grid 14 via supply chute 22 in communication with the grid. Located in pump block 12 is a collection chamber 24 which forms a reservoir for molten polymer and has a melt pump 26 mounted therein to supply molten polymer to the meter pump 30 then to spinning packs 28 where it is extruded as filaments 29.

Figure 3:
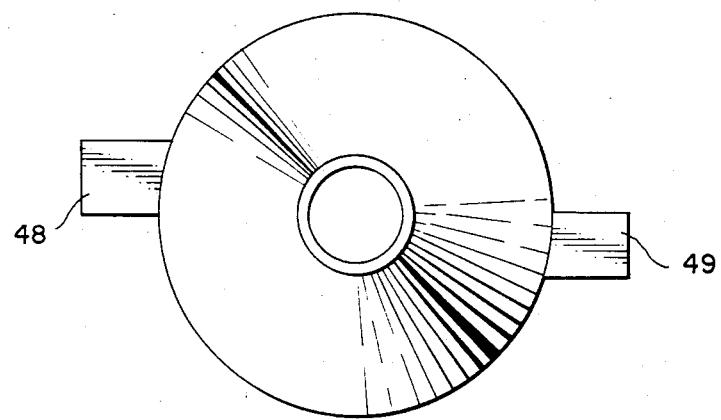
FIG. 3 is a plan view of FIG. 2.

The molten polymer collects as a pool 32 in collection chamber 24. In order to stir this pool of molten polymer a stirrer 34 is provided. The stirrer 34 is attached to a hub shaft 38 which engages a drive shaft 40. The bottom of the hub shaft engages and drives melt pump 26. The upper end of drive shaft 40 passes through the grid to electric motor 18 which drives the stirrer and melt pump. A cone 42 having an apex 44 and a base 46 is fastened to shaft 40 at a location above the melting grid but below the source of supply of the polymer flakes, i.e., chute 22. The apex of the cone is directed upward toward supply tube 20. Attached to the periphery of the base 46 of the cone is an opposed pair of blades 48, 49. They are slightly offset as shown in FIG. 3.

The addition of the cone 42 to the apparatus serves to distribute the flakes away from the center of the grid toward its sidewalls to reduce the temperature gradient experienced without the cone 42 in place.

In a series of runs using a cone 42, similar to the one shown and described above, operation was permitted at more uniform polymer melt temperatures which reduced denier and draw tension variation in extruded filaments.

I claim:

1. In an apparatus for melting particulate polymeric material including a melting grid, said grid having a center and a sidewall, a source of particulate material located above melting grid, a collecting chamber for the molten polymer placed beneath the grid and a rotatably driven central shaft coaxial with the collecting chamber and te melting grid, said shaft extending above said source, the improvement of an apparatus for distributing said particulate material away from the center to the sidewalls of the grid comprising: a cone fastened to said shaft at a location below said source and above said melting grid, said cone having an apex directed upward toward said source and a base, said base having an opposed pair of blades offset from each other extending from a periphery of the base.

* * * * *